UNITED STATES PATENT OFFICE.

CARL STRAUB, OF OTISCO VALLEY, NEW YORK.

COMPOSITION FOR CEMENT, PLASTER, &c.

SPECIFICATION forming part of Letters Patent No. 636,866, dated November 14, 1899.

Application filed December 27, 1898. Serial No. 700,326. (No specimens.)

*To all whom it may concern:*

Be it known that I, CARL STRAUB, of Otisco Valley, in the county of Onondaga, in the State of New York, have invented new and useful Improvements in Compositions for Cement or Plaster, &c., for Building Purposes, of which the following is a full, clear, and exact description.

My composition consists of the following ingredients combined, substantially, in the proportions stated—viz., slaked lime, (pure or impure,) one cubic foot; aluminium oxid or bauxite, from one foot to four cubic feet; water substantially pure in quantity sufficient to form a plastic or semiliquid mass, as desired. These ingredients are to be thoroughly mingled by agitation. A quantity of fine mica may be included in the proportion of aluminium oxid to render the composition more heat-resisting.

My composition produces a comparatively inexpensive and durable cement or plaster for building purposes.

By "aluminium oxid" I mean hydrated aluminium oxid, which is found in considerable quantities in some of the States of the Union, more particularly Georgia, Alabama, and Florida, which are known to have considerable deposits of aluminium oxid, commonly called "bauxite," and in Virginia and North and South Carolina, where the primary rock is found in various states of transition—from the state of intact crystallization to perfect decomposition. In most instances it forms part of extensive rock formations, either of primary origin or as the product of subsequent transition. Granite, gneiss, syenite, and schistose rocks in state of deterioration, forming immense beds of this crumbling and soft material, soft rocks of later formation, especially argillaceous shales, as the Hamilton and Marcellus shales, and the stones of the saline formation in New York State are well adapted for use in the manufacture of my cement when combined with slaked lime.

The main sources for obtaining alumina (oxid of aluminium) in suitable quantities are mainly those coming from decayed primary rock which is in a state of decomposition, so far advanced as to form a powdery substance easily ground between the fingers, but not so far advanced as to form true clay. In this state it forms immense deposits in the foot-hills and mountains of part of Virginia and North and South Carolina and needs only to be taken (the other parts of the decayed rock included) like sand and shipped to desired places. As long as the constituent parts of the rock—granite, for instance—are in a firm crystallized state the alumina forms, of course, an integral part of the feldspar (part of the rock) and is for my purposes unavailable; but when decay of the rock has already set in sufficient to liberate the constituent parts of the stone (mainly quartz, feldspar, and mica) a contemporary decay of the feldspar has, as a rule, set in. This leaves free the soda or potash contained in feldspar to be washed out by percolating waters, there remaining only silica and alumina. During this period of decay the alumina is easily acted upon by caustic lime, as proven by my experiments. The last stage of decomposition of the rock is shown when silica and alumina, remaining in position close together, commence to form ultimately a hydrous silicate of alumina, in which state its usefulness for my purpose has ceased.

Mortar produced by my composition and containing aluminium oxid is especially adapted for use on foundations, and especially at places where periodical excess of moisture makes it desirable to use a cement that withstands the action of water. When combined with mica, usually found in great quantities as a constituent of the deteriorated gneiss or granite, the mortar becomes an excellent fireproof material.

Lime (calcium oxid) and aluminium oxid, especially in combination with mica, form a mortar which hardens in a short time, is far better to handle with the trowel than the common lime-mortar, and is not as heavy in weight. When deterioration of granite, &c., has gone so far as to form clay, (a chemically close combination of alumina and silica,) a heating of the clay is necessary to bring it into a condition to act on lime. Acids, subacids, and salts tending to form stable combinations insoluble in water with lime and alumina can be added, and also improve the consistency and hardness of the mortar.

I desire to have it understood that when I have stated herein that from one foot to four cubic feet of aluminium oxid is used in the composition that this quantity includes the sand, mica, or other suitable material that is desirable to mix with it.

The lime and aluminium oxid may be mixed or combined together in a dry state in proper proportions ready for the addition of the water. Therefore I desire to claim the combination of the dry ingredients without the water.

What I claim, and desire to secure by Letters Patent of the United States, is—

1. The herein-described composition of matter, consisting of water, slaked lime and bauxite, substantially as described and for the purpose specified.

2. The herein-described composition of matter for the manufacture of plaster, cement, &c., consisting of slaked lime one cubic foot, bauxite from one foot to four cubic feet, and a sufficient quantity of pure water to form a plastic or semiliquid mass, substantially as described.

3. The herein-described composition of matter for the manufacture of plaster, cement, &c., consisting of slaked lime, bauxite, mica and water, substantially as described and for the purpose specified.

4. The herein-described composition of matter for the manufacture of cement, plaster, &c., consisting of slaked lime and bauxite in the proportions specified.

In testimony whereof I have hereunto signed my name.

CARL STRAUB. [L. S.]

Witnesses:
M. J. CHRYST,
H. M. SEAMANS.